United States Patent [19]
Suzuki

[11] Patent Number: 5,091,815
[45] Date of Patent: Feb. 25, 1992

[54] HIGH PACKING DENSITY DISK CARTRIDGE WITH WRITE PROTECT MECHANISM

[75] Inventor: Yuji Suzuki, Kanagawa, Japan
[73] Assignee: Sony Corporation, Tokyo, Japan
[21] Appl. No.: 261,906
[22] Filed: Oct. 25, 1988
[30] Foreign Application Priority Data
 Oct. 30, 1987 [JP] Japan .................. 62-275409
[51] Int. Cl.$^5$ ........................... G11B 23/03
[52] U.S. Cl. .................................. 360/133
[58] Field of Search ...................... 360/133, 60
[56] References Cited
 U.S. PATENT DOCUMENTS
 5,041,923 8/1991 Iwata et al. ............... 360/133

*Primary Examiner*—Robert S. Tupper
*Attorney, Agent, or Firm*—Lewis H. Eslinger; Donald S. Dowden

[57] ABSTRACT

A disk cartridge includes a first identification recess for serving to prevent data stored on a magnetic disk from being erroneously erased from the disk and to prevent new data from being erroneously written on the disk, a second identification recess for discriminating a 4 or 6 MB disk cartridge from a 1 or 2 MB disk cartridge, and a third identification recess for discriminating a high packing density disk cartridge from other types of disk cartridge. The third identification recess is arranged at a point located on a straight line drawn between two recesses which are formed on the opposed side edges of the disk cartridge at a location neighboring the front edge thereof.

10 Claims, 4 Drawing Sheets

HIGH PACKING DENSITY DISK CARTRIDGE WITH WRITE PROTECT MECHANISM

BACKGROUND OF THE INVENTION

1. Field of the Invention

The present invention relates generally to a disk cartridge with a write protect mechanism which prevents data stored on a magnetic disk from being erroneously erased from the disk and prevents new data from being erroneously written on the disk. More specifically, the invention relates to a high packing density disk cartridge with a write protect mechanism which has an identification recess for discriminating it from other types disk cartridge.

2. Description of the Background Art

Generally, disk cartridges have an erroneous erasure preventing mechanism or write protect mechanism in order to prevent the data stored on the magnetic disk from being erroneously erased from the disk and to prevent new data from being erroneously written on the disk. Such write protect, mechanisms are described in the U.S. Pat. Nos. 4,460,930 and 4,549,240.

Recent improvements of disk type storage media make the increase of packing density or track density thereof possible, so that disk cartridges having the same shape as that of conventional disk cartridges can have higher memory capacity. However, in cases where the shape of such a high packing density disk cartridge is the same as that of the conventional low packing density disk, when the high packing density disk cartridge is loaded into an adapted disk drive unit for low packing density disk cartridges, or when the low packing density disk cartridge is loaded into a disk drive unit adapted for high packing density disk cartridges, then the data stored on the magnetic disk tends to be destroyed due to the differences of recording characteristics, the width of track and so forth therebetween. In order to prevent such accidents, it is required to provide the write protect mechanism of the disk cartridge with an additional identification recess, by which the disk drive unit can discriminate a high packing density disk cartridge from other types disk cartridge so that it is not active when an incompatible type of cartridge is set thereon.

Figure 1A:
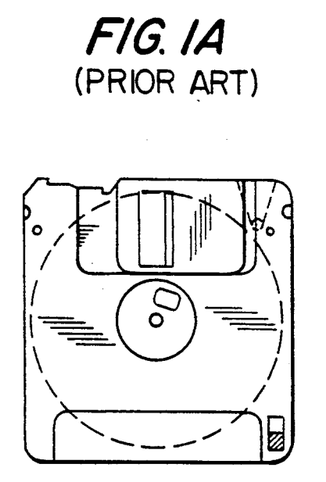
FIG. 1A is a bottom plan view of a 1 MB disk cartridge in the prior art.
Figure 1B:
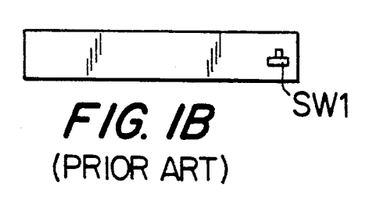
FIG. 1B is a view in elevation of a portion of a disk drive unit adapted to cooperate with the disk drive unit of FIG. 1A.

FIG. 1A illustrates a conventional 1 MB disk cartridge which is provided with a write protect mechanism. The write protect mechanism comprises an essentially rectangular first identification (ID) recess which is formed in the lower half at a location neighboring the rear-right corner thereof, and a manually operable switching member which engages the first ID recess so as to be movable between two positions, i.e. forward and backward positions. The disk drive unit for the 1 MB disk cartridge is provided with a first detecting switch SW1. In cases where the manually operable switching member is positioned at the rearward position of the first ID recess, the first detecting switch SW1 is designed to be received in the first ID recess when the disk cartridge is set in the disk drive unit. When the first detecting switch SW1 is depressed, it is turned ON, and when it is not depressed, i.e. when it is received in the first ID recess, it is OFF. In response to turning OFF of the first detecting switch, i.e. when the first detecting SW1 is received in the first ID recess at the forward position, write protect is performed. Therefore, in the cases where the manually operable switching member is positioned at the rearward position of the first ID recess, when the disk cartridge is set in the disk drive unit, it is possible to prevent the data stored on the magnetic disk from being erroneously erased from the disk and to prevent new data from being erroneously written on the disk, since the first detecting switch SW1 is not depressed and so remains OFF.

Figure 2A:
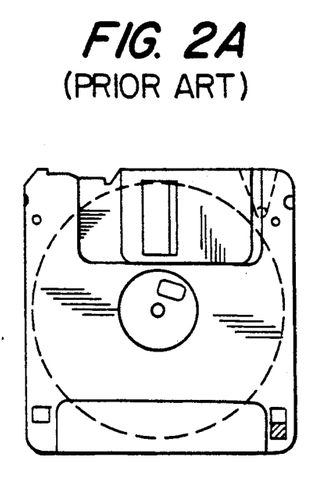
FIG. 2A is a bottom plan view of a 2 MB disk cartridge in the prior art.
Figure 2B:
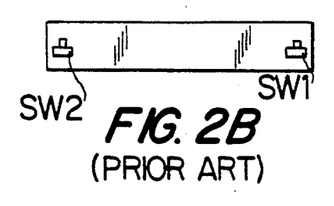
FIG. 2B is a view in elevation of a portion of a disk drive unit adapted to cooperate with the disk drive unit of FIG. 2A.

In the case of 2 MB disk cartridge shown in FIG. 2A, an essentially rectangular second ID recess is also provided in the lower half of the cassette casing at a location neighboring the rear-left corner. The second ID recess is arranged so that a straight line drawn between the forward position of the first ID recess and the position of the second ID recess is essentially parallel to the rear edge of the cassette casing. The disk drive unit for this 2 MB disk cartridge is provided with a second detecting switch SW2 besides the first detecting switch SW1. The second detecting switch SW2 is designed to be received in the second ID recess when the 2 MB disk cartridge is set on the disk drive unit. When the second detecting switch SW2 is depressed to be turned ON, it is detected that another type disk cartridge is set on the disk drive unit so that write protect is performed. Therefore, when a 1 MB disk cartridge is erroneously set on the disk drive unit for the 2 MB disk cartridge, it is possible to prevent the data stored on the magnetic disk from being erroneously erased from the disk and to prevent new data from being erroneously written on the disk, since the second detecting switch SW2 is depressed to become ON.

Figure 3A:
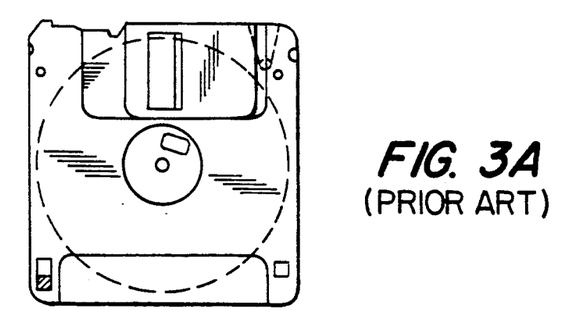
FIG. 3A is a bottom plan view of a 4/6 MB disk cartridge in the prior art.
Figure 3B:
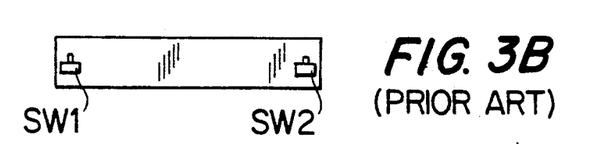
FIG. 3B is a view in elevation of a portion of a disk drive unit adapted to cooperate with the disk drive unit of FIG. 3A.

FIG. 3A illustrates another disk cartridge having 4 or 6 MB packing density, which will be referred to as "4/6 MB disk cartridge". In this 4/6 disk cartridge, the positions of first and second ID recesses are the reverse of their positions in the 2 MB disk cartridge. The positions of first and second detecting switches SW1 and SW2 are also the reverse of their positions in the 2 MB disk cartridge. That is, the first ID recess and the first detecting switch SW1 are arranged at a location neighboring the rear-left corner, and the second ID recess and the second detecting switch SW2 are arranged at a location neighboring the rear-right corner. Therefore, even if a 2 MB disk cartridge is erroneously set in the disk drive unit for the 4/6 MB disk cartridge, write protection is provided since the first detecting switch SW1 is not depressed and so remains OFF. The manually operable switching member is usually positioned at the forward position when the user wants to write the data on the magnetic disk. Therefore, even if a 1 MB disk cartridge is erroneously set on the disk drive unit for the 4/6 MB disk cartridge, write protection is provided since the second detecting switch SW2 is depressed to be turned ON. On the other hand, even if a 4/6 MB disk cartridge is erroneously set on the disk drive unit for the 1 or 2 disk cartridge, write protection is provided since the first detecting switch SW1 is not depressed and so remains OFF.

As set forth above, discrimination between 1, 2 and 4/6 disk cartridge has been achieved in the prior art.

Recently, disk cartridges having still higher packing density, such as 16 MB disk cartridges, have been developed. It is required to provide such 16 MB disk cartridges with another ID recess by which the set disk cartridge is identified as a 16 MB disk cartridge. If such an ID recess is formed in the cassette casing at a poorly selected position, the detecting switch corresponding to the ID recess can be not easily provided for the 16 MB disk cartridge.

SUMMARY OF THE INVENTION

It is therefore a principal object of the present invention to eliminate the aforementioned disadvantage and to provide a high packing density disk cartridge with an additional identification recess by which discrimination between the high density disk cartridge and other types disk cartridge can be achieved.

It is another object of the invention to provide a high density disk cartridge in which an additional identification recees is formed at a preferable position thereof.

In order to accomplish the aforementioned and other specific objects, a disk cartridge, according to the present invention, is formed with an additional identification recess at a predetermined position.

According to one aspect of the present invention, the disk cartridge comprises:

a disk;

a cassette casing rotatably housing the disk therein;

an opening, formed in the cassette casing at a location neighboring the front edge thereof, for exposing a part of the disk to the outside a pair of first and second recesses, formed on the opposed side edges of the cassette casing at a location neighboring the front edge, for serving to draw the disk cartridge into a disk drive unit; and a first identification recess, formed in the cassette casing at a point located on a straight line drawn between the first and second recess, for discriminating the type of disk cartridge.

The disk cartridge may further comprise a second identification recess, associated with the first identification recess, for discriminating the type of disk cartridge, the second identification recess being formed in the cassette casing on the straight line at a location neighboring the first identification recess.

According to another aspect of the invention, the disk cartridge comprises:

a magnetic disk for storing data thereon;

a cassette casing which comprises essentially rectangular first and second members to rotatably house the magnetic tape therein;

an opening, formed in at least one of the first and second members at a location neighboring the front edge thereof, for exposing a part of the magnetic disk to the outside;

a pair of first and second recesses, formed on the opposed side edges of the first member at a location neighboring the front edge, for serving to draw the disk cartridge into a disk drive unit; and means for identifying the type of disk cartridge, the means including first and second identification recesses formed in the first member at a location neighboring the rear corner and a third identification recess formed in the first member at a point located on a straight line drawn between the first and second recess.

The means may serve to prevent data stored on the magnetic disk from being erroneously erased from the magnetic disk and to prevent new data from being erroneously written on the magnetic disk, when an incompatible type of disk cartridge is set in the disk drive unit. The first identification recess may engage a manually movable member which is movable between a first position in which data stored on the magnetic disk are prevented from being erroneously erased and new data on the magnetic disk are prevented from being erroneously written, and a second position in which the erasure and writing of data are allowed.

According to another aspect of the invention, the disk cartridge comprises:

a magnetic disk for storing data thereon;

a cassette casing which comprises essentially rectangular first and second members to rotatably house the magnetic tape therein;

an opening, formed in at least one of the first and second members at a location neighboring the front edge thereof, for exposing a part of the magnetic disk to the outside;

a pair of first and second recesses, formed on the opposed side edges of the first member at a location neighboring the front edge, for serving to draw the disk cartridge into a disk drive unit;

a first identification recess formed in the first member at a location neighboring one of the rear coners thereof, the first identification recess engaging a manually operable member which is movable between a first positon in which data stored on the magnetic disk are prevented from being erroneously erased and new data are prevented from being erroneously written on the magnetic disk, and a second position in which the erasure and write of data are allowed;

a second identification recess formed in the first member at a location neighboring the other rear coner thereof; and a third identification recess formed in the first member at a point located on a straight line drawn between the first and second recesses, the third identification recess being associated with the second identification recess for serving to discriminate the type of disk cartridge.

The third identification recess may be associated with the first identification recess for serving to discriminate the type of disk cartridge. The disk cartridge may further comprise a fourth identification recess formed in the first member at a point located on the straight line and separated from the third identification recess by a predetermined distance, the fourth identification recess being associated with the second and third identification recesses for serving to discriminate the type of disk cartridge. The fourth identification recess may be associated with the first identification recess for serving to discriminate the type of disk cartridge.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but for explanation and understanding only.

In the drawings.

DESCRIPTION OF THE PREFERRED EMBODIMENT

Figure 4:
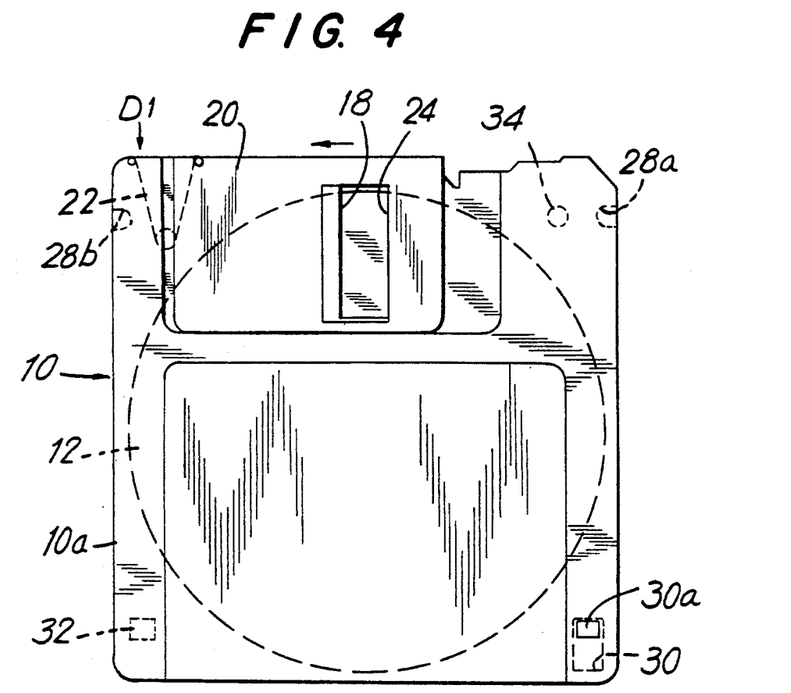
FIG. 4 is a plan view of a 16 MB disk cartridge according to the present invention.
Figure 5:
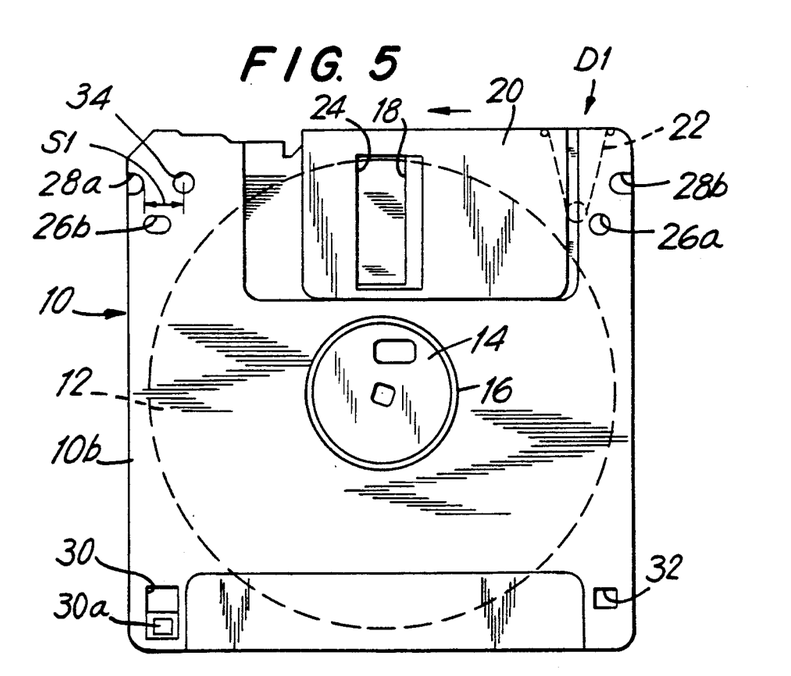
FIG. 5 is a bottom plan view of the disk cartridge of FIG. 4.

Referring now to the drawings, particularly to FIGS. 4 and 5, a disk cartridge D1 having 16MB (megabytes) packing density, which will be referred to as "16 MB disk cartridge", includes an essentially rectangular shaped cassette casing 10. The cassette casing 10 comprises an upper half 10a and a lower half 10b, and houses a magnetic disk 12 therein so as to pivotably support the latter on the inner walls thereof. A center hub 14 is secured to the magnetic disk 12 at the center portion thereof. The center hub 14 is exposed to the outside thorough a hub opening 16 which is formed in the lower half 10b at its center portion. When the disk cartridge D1 is loaded on a disk drive unit, the center hub 14 is designed to be chucked on a chucking section of the disk drive unit to be rotated.

The cassette casing 10 is provided with a disk exposing mechanism which exposes a part of magnetic disk 12 to the outside. The disk exposing mechanism comprises a pair of essentially rectangular shaped disk exposing openings 18, a sliding shutter 20 and a torsion coil spring 22. The disk exposing openings 18 are formed in the upper and lower halves 10a and 10b of the cassette casing 10 at the front portion thereof so that a part of magnetic disk 12 is exposable to the outside. The sliding shutter 20 is slidably supported on the cassette casing 10, and is formed with shutter openings 24 having substantially the same shape as that of the disk exposing openings 18, so that the sliding shutter 20 can open and close the disk exposing openings 18. One end of the torsion coil spring 22 engages the sliding shutter 20 and the other end is supported on the cassette casing 10, so that the sliding shutter 20 is biased by means of the torsion coil spring 22 to close the disk exposing openings 18. When the sliding shutter 18 is slid against the thrusting force of the torsion coil spring 22, the position of the shutter openings 24 of the sliding shutter 20 is designed to coincide with that of the disk exposing openings 18 so as to set the sliding shutter 20 at the open position in which a part of magnetic disk 22 is exposed to the outside.

The lower half 10b of the cassette casing 10 is formed with positioning recesses 26a and 26b at locations neighboring the front edge as well as the side edges thereof, respectively. The positioning recess 26a has an essentially circular shape and the recess 26b has an essentially oval shape. A pair of positioning pins provided in the disk drive unit are designed to be received into the positioning recesses 26a and 26b, and other positioning pins are designed to come into contact with the lower half 10b of the cassette casing 10 at a rear positioning location thereof. By the engagements thereof, the loading position of disk cartridge D1 within the disk drive unit is determined.

In addition, half circular recesses 28a and 28b are formed in the side edges of the lower half 10b at the forward positions of the positioning recesses 26a and 26b. The half circular recesses 28a and 28b open to the both sides of the lower half 10b, so as to serve to engage with disk drive mechanisms which draws the disk cartridge D1 into the disk drive unit to be automatically loaded therein. That is, when the disk cartridge D1 is inserted from the inlet of the disk drive unit, cartridge drawing pins engage the half circular recesses 28a and 28b, and then the disk cartridge D1 is automatically drawn to the loading position.

The lower half 10b is also formed with essentially rectangular shaped first and second identification (ID) recesses 30, 32 and with a circular third identification recess 34 for an erroneous erasure preventing or write protect mechanism.

Figure 6:
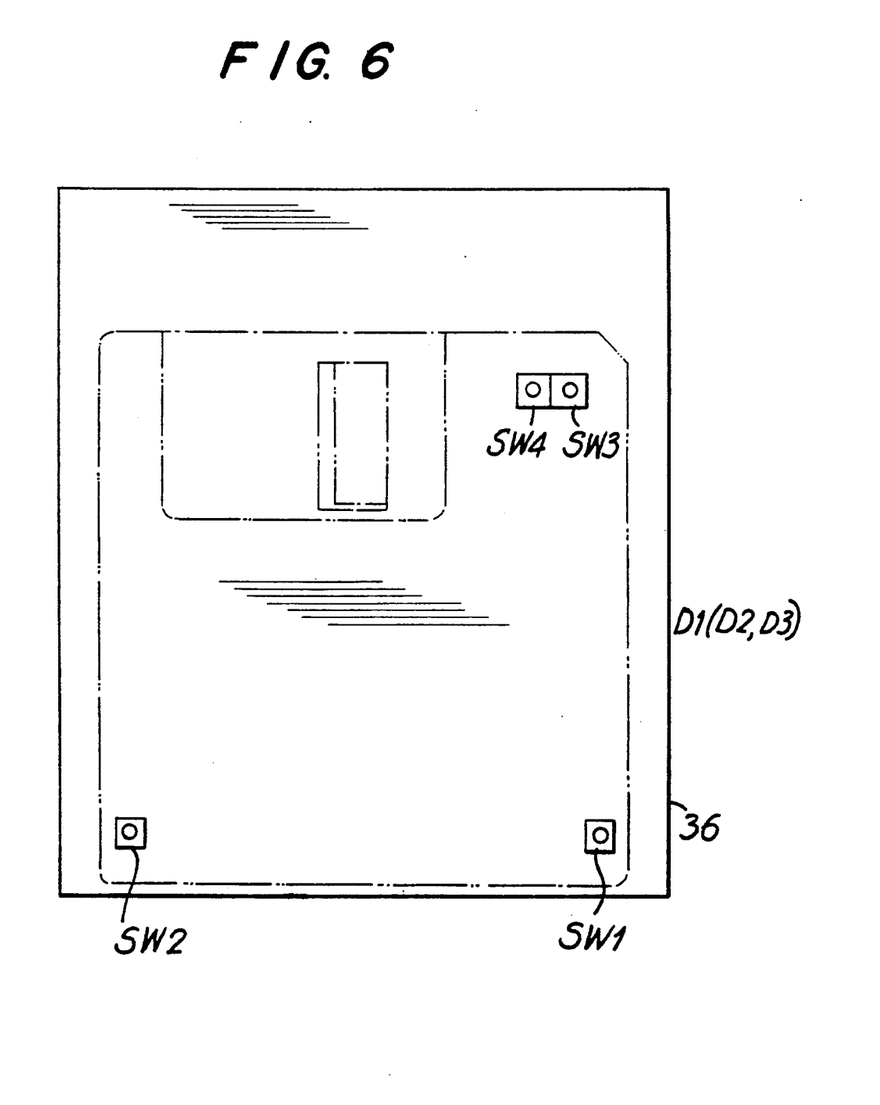
FIG. 6 illustrates the positions of detecting switches in the disk drive unit for 16, X or Y MB disk cartridge, according to the present invention.

The first ID recess 30 is arranged at a location neighboring the rear left corner thereof. A manually operable switching member 30a engages the first ID so as to be movable between two positions, i.e. forward and backward positions. As shown in FIG. 6, a disk drive unit 36 for the 16 MB disk cartridge is provided with a first detecting switch SW1. In cases where the manually operable switching member is positioned at the rearward position of the first ID recess, the first detecting switch SW1 is designed to be received in the first ID recess 30 when the disk cartridge is set on the disk drive unit. When the first detecting switch SW1 is depressed, it is turned ON, and when it is not depressed, i.e. when it is received in the first ID recess 30, it becomes OFF. In response to turning OFF of the first detecting switch SW1, i.e. when the first detecting switch SW1 is received in the first ID recess 30 at the forward position, write protect is performed. Therefore, in the cases where the manually operable switching member is positioned at the rearward position of the first ID recess 30, when the disk cartridge is set in the disk drive unit, it is possible to prevent the data stored on the magnetic disk 12 from being erroneously erased from the disk and to prevent new data from being erroneously written on the magnetic disk 12, since the first detecting switch SW1 is not depressed and remains OFF.

The second ID recess 32 is arranged at a location neighboring the rear-right corner thereof so that a straight line drawn between the forward position of the first ID recess 30 and the position of the second ID recess 32 is essentially parallel to the rear edge of the cassette casing 10. The disk drive unit 36 is also provided with a second detecting switch SW2. The second detecting switch SW2 is designed to be received in the second ID recess 32 when the 16 MB disk cartridge is set on the disk drive unit 36. When the second detecting switch SW2 is depressed so as to be turned ON, it is detected that another type disk cartridge is set in the disk drive unit 36, so that write protect is performed. As can be seen from the aforementioned description, the positions of the first and second ID recesses 30 and 32 are similar to that of the 4/6 disk cartridge. The positions of the first and second detecting switches SW1 and SW2 are also similar to that of the 4/6 disk cartridge. On the other hand, as mentioned above, these positions are the reverse of their positions in the 2 MB disk cartridge. Therefore, even if a 2 MB disk cartridge is erroneously set on the disk drive unit 36, write protect can be performed since the first detecting switch SW1 is not depressed and remains OFF. Since the manually operable switch member is usually positioned at the forward position when the user wants to write the data on the magnetic disk, even if a 1 MB disk cartridge is erroneously set in the disk drive unit 36, the second detecting switch SW2 is depressed so as to be turned ON so that the write protect mode is assumed. On the other hand, even if a 16 MB disk cartridge is erroneously set on the disk drive unit for the 1 or 2 MB cartridge, the write protect mode is assumed since the first detecting switch SW1 which is provided on the disk drive unit for 1 or 2 MB cartridge is not depressed and remains OFF.

As mentioned above, since the positions of the first and second ID recesses as well as the first and second detecting switches SW1 and SW2 are similar to that of the 4/6 MB disk cartridge, another ID recess is required in order to discriminate the 16 MB disk cartridge from 4/6 disk -cartridge. The third ID recess 34 serves as a recess for detecting the 16 MB disk cartridge. The third ID recess is arranged on a straight line drawn between the half circular recesses 28a and 28b, and at a location separated from the half circular recess 28a by small distance S1. In this embodiment, since the torsion coil spring 22 is arranged at a location neighboring the front-right corner, the third ID recess 34 is arranged at a location neighboring the front-left corner.

Figure 7:
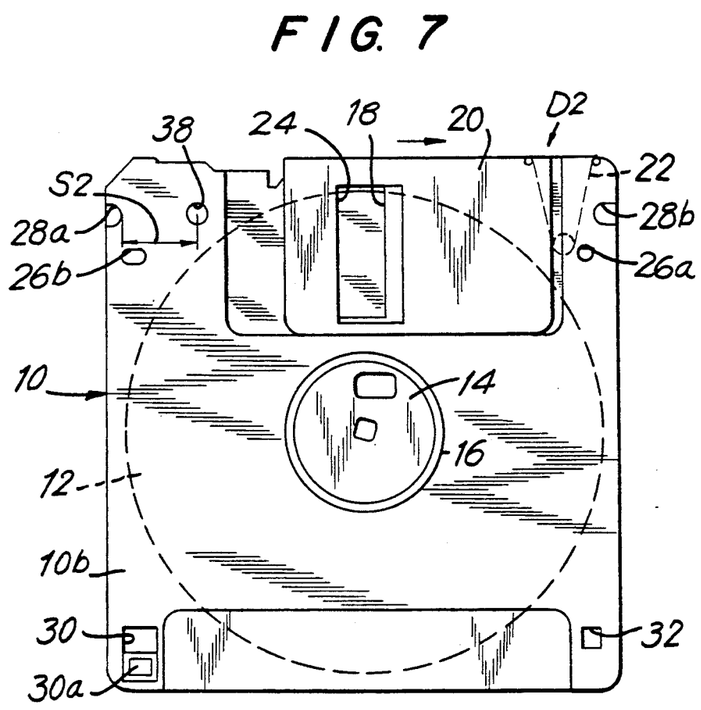
FIG. 7 is a bottom plan view of an X (X>16) MB disk cartridge according to the present invention.

FIG. 7 illustrates another type of disk cartridge D2 having X (more than 16) MB of packing density, which will be referred to as "X MB disk cartridge", according to the present invention. The construction of this X MB disk cartridge D2 is the same as that of the 16 MB disk cartridge except that a fourth ID recess is substituted for the third ID recess. The fourth ID recess is arranged on the straight line drawn between the half circular recess 28a and 28b, and at a location separated from the half circular recess 28a by a distance S2 which is larger than the distance S1.

Figure 8:
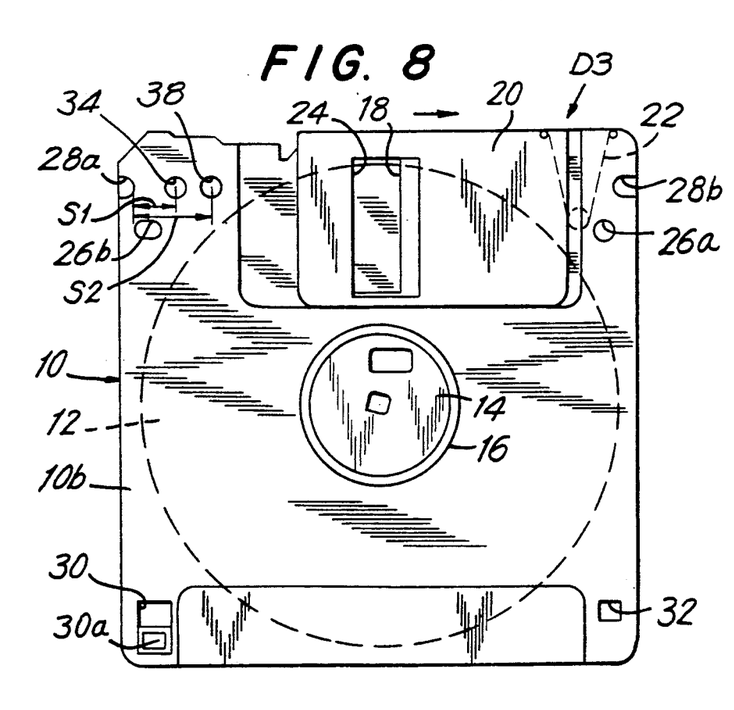
FIG. 8 is a bottom plan view of a Y MB disk cartridge, which does not allow a disk drive unit for the 16 or X MB disk cartridge to be active, according to the present invention.

FIG. 8 illustrates another type disk cartridge D3 having Y MB of packing density, which will be referred to as "Y MB disk cartridge", according to the present invention. As mentioned later in detail, the Y MB disk cartridge is designed to be active in each of disk drive units for the 16 MB and X MB disk cartridges. The construction of this Y MB disk cartridge D3 is the same as that of the 16 MB disk cartridge D1 and the X MB disk cartridge D2 except that both the third and fourth ID recesses 34 and 38 are provided therein.

According to the present invention, the disk drive unit 36 shown in FIG. 5 can be used for the disk cartridges D1, D2 and D3. In order to distingush one of the disk cartridges D1, D2 and D3 from the other type disk cartridge, the disk drive unit 36 is provided with third and fourth detecting switches SW3 and SW4 in addition to the first and second detecting switches SW1 and SW2. The third detecting switch SW3 is designed to be received in the third ID recess 34 when the 16 MB or Y MB disk cartridge D1 or D3 is set on the disk drive unit 36. The fourth detecting switch SW4 is designed to be received in the fourth ID recess 38 when the X MB or Y MB disk cartridge D2 or D3 is set in the disk drive unit 36. When the third and fourth detecting switches SW3 and SW4 are not received in the corresponding ID recesses and are depressed, they are turned ON to produce ON signal, respectively.

When a 1 or 2 MB disk cartridge is set in the disk drive unit 36, both of the third and fourth detecting switches SW3 and SW4 are depressed to be turned ON. Therefore, it can be detected that 1 or 2 MB disk cartridge is set in the disk drive unit 36. When 16 MB disk cartridge D1 is set in the disk drive unit 36, the fourth detecting switch SW4 is depressed so as to be turned ON, and when the X MB disk cartridge D2 is set therein, the third detecting switch SW3 is depressed so as to be turned ON. Therefore, it can be detected that 16 or X MB disk cartridge D1 or D2 is set on the disk drive unit 36.

When the Y MB disk cartridge D3 is set on the disk drive unit 36, the third and fourth detecting switches SW3 and SW4 are received in the third and fourth ID recesses 34 and 38, respectively. As a result, the detecting switches SW3 and SW4 are not depressed and so remain OFF. Since the detecting switches SW3 and SW4 also remain OFF when no disk cartridge is set on the disk drive unit 36, an additional detecting switch is preferably provided for a disk drive unit used for the Y MB disk cartridge D3. As a result, it can be detected that the Y MB disk cartridge D3 is set on the disk drive unit.

As mentioned above, according to the present invention, it is possible to easily discriminate one of 1, 2, 16, X and Y MB disk cartridges from another type of disk cartridge, so that desired write protect can be achieved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A disk cartridge of a type compatible with a disk drive unit of a predetermined design but that can also be drawn into a disk drive unit of a different design with which it is incompatible, said disk cartridge comprising:
   a disk;
   a cassette casing having a front edge and opposed side edges and rotatably housing the disk therein;
   an opening formed in the cassette casing at a location neighboring the front edge thereof for exposing a part of the disk to the outside;
   a pair of first and second recesses formed on the opposed side edges of the cassette casing at a location neighboring the front edge for facilitating the drawing of the disk cartridge into the disk drive unit; and
   a third identification recess formed in the cassette casing at a point located on a straight line drawn between said first and second recesses for discriminating the type of disk cartridge.

2. A disk cartridge as set forth in claim 1, which further comprises a fourth identification recess associated with said third identification recess for discriminating the type of disk cartridge, said fourth identification recess being formed in the cassette casing on the straight line at a location neighboring said third identification recess.

3. A disk cartridge as set forth in claim 1, wherein the disk drive units involved have packing densities of 1, 2, 4, 6, 16 or X MB, where X>16.

4. A disk cartridge of a type compatible with a disk drive unit of a predetermined design but that can also be drawn into a disk drive unit of a different design with which it is incompatible, said disk cartridge comprising:
   a magnetic disk for storing data thereon;
   a cassette casing formed of essentially rectangular first and second members to rotatably house the magnetic tape therein, said cassette casing and each of said members having a front edge, opposed side edges, and a pair of rear corners;
   an opening formed in a least one of the first and second members at a location neighboring the front edge thereof for exposing a part of the magnetic disk to the outside;
   a pair of first and second recesses formed on the opposed side edges of the first member at locations neighboring the front edge for facilitating the drawing of the disk cartridge into the disk drive unit; and
   identifying means for identifying the type of disk cartridge, said means including first and second identification recesses formed in the first member at locations respectively neighboring said rear corners and a third identification recess formed in the first member at a point located on a straight line drawn between said first and second recesses.

5. A disk cartridge as set forth in claim 4, wherein said identifying means serves to prevent data stored on the magnetic disk from being erroneously erased from the magnetic disk and to prevent new data from being erroneously written on the magnetic disk, when an incompatible type of disk cartridge is set in the disk drive unit.

6. A disk cartridge as set forth in claim 5, wherein said first identification recess cooperates with a manually movable member which is movable between a first position in which data stored on the magnetic disk are prevented from being erroneously erased and new data are prevented from being erroneously written on the magnetic disk, and a second position in which the erasure and writing of data are enabled.

7. A disk cartridge of a type compatible with a disk drive unit of a predetermined design but that can also be drawn into a disk drive unit of a different design with which it is incompatible, said disk cartridge comprising:
   a magnetic disk for storing data thereon;
   a cassette casing formed of essentially rectangular first and second members to rotatably house the magnetic disk therein, said cassette casing and each of said members having a front edge, opposed side edges, and a pair of rear corners;
   an opening formed in at least one of the first and second members at a location neighboring the front edge thereof for exposing a part of the magnetic disk to the outside;
   a pair of first and second recesses formed on the opposed side edges of the first member at a location neighboring the front edge, for facilitating the drawing of the disk cartridge into the disk drive unit;
   a first identification recess formed in the first member at a location neighboring one of the rear corners thereof, said first identification recess engaging a manually operable member which is movable between a first position in which data stored on the magnetic disk are prevented from being erroneously erased and new data are prevented from being erroneously written on the magnetic disk, and a second position in which the erasure and writing of data are enabled;
   a second identification recess formed in the first member at a location neighboring the other rear corner thereof; and
   a third identification recess formed in the first member at a point located on a straight line drawn between said first and second recesses, said third identification recess being associated with said second identification recess for discriminating the type of disk cartridge.

8. A disk cartridge as set forth in claim 7, wherein said third identification recess is associated with said first identification recess for discriminating the type of disk cartridge.

9. A disk cartridge as set forth in claim 7, which further comprises a fourth identification recess formed in the first member at a point located on said straight line and separated from the third identification recess by a predetermined distance, said fourth identification recess being associated with said second and third identification recesses for discriminating the type of disk cartridge.

10. A disk cartridge as set forth in claim 9, wherein said fourth identification recess is associated with said first identification recess for discriminating the type of disk cartridge.

* * * * *

UNITED STATES PATENT AND TRADEMARK OFFICE
CERTIFICATE OF CORRECTION

PATENT NO. : 5,091,815
DATED : February 25, 1992
INVENTOR(S) : Yuji Suzuki

It is certified that error appears in the above-indentified patent and that said Letters Patent is hereby corrected as shown below:

```
Col. 1, line 22, after "protect" delete ","
Col. 6, line 25, change "rear left" to --rear-left--
Col. 7, line 22, before "cartridge" delete "-"
```

Signed and Sealed this

Fourth Day of October, 1994

Attest:

BRUCE LEHMAN

*Attesting Officer*   *Commissioner of Patents and Trademarks*